W. D. IVEY.
Plow-Fender.
No. 27,808.
Patented Apr. 10. 1860.
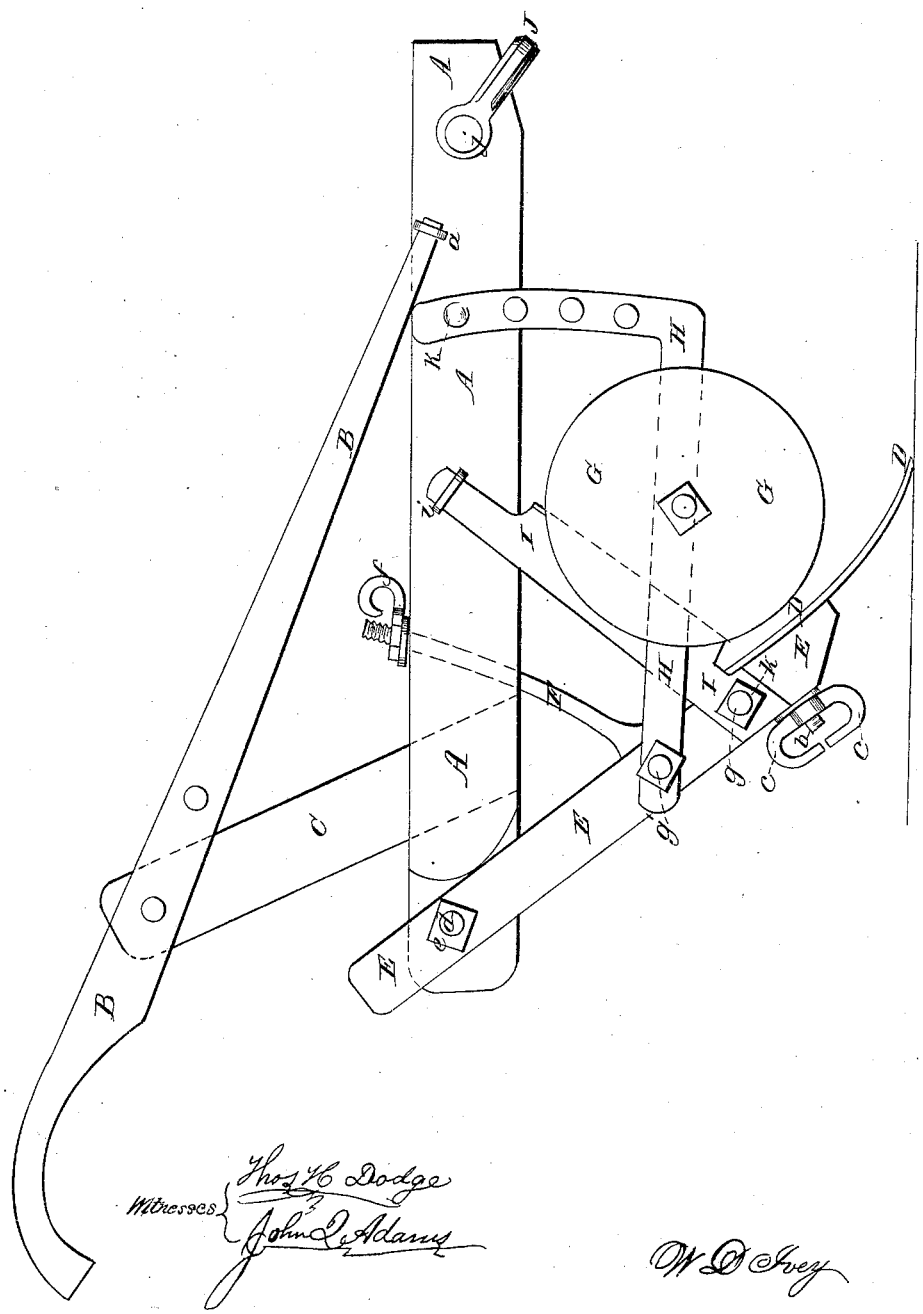

UNITED STATES PATENT OFFICE.

WM. D. IVEY, OF MILFORD, GEORGIA.

IMPROVEMENT IN PLOWS.

Specification forming part of Letters Patent No. 27,808, dated April 10, 1860.

*To all whom it may concern:*

Be it known that I, WILLIAM D. IVEY, of Milford, Baker county, in the State of Georgia, have invented a new and useful Improvement in Plows; and I do hereby declare that the following is a full, clear, and exact description thereof, reference being had to the accompanying drawing, forming a part of this specification.

The present invention consists of an improvement upon a plow, (for which the said IVEY is about applying for a joint patent in connection with Mark Rigell, of Dawson, Georgia,) as will be more fully set forth hereinafter.

A represents the draft-beam of the plow, to which are attached the handles B, one on each side, the front ends of the handles being inserted in staples $a$, only one of which is shown in the drawing. The handles are connected at the rear by a cross-piece which passes through the top of the standard C. The plow-point D is connected by a bolt, $b$, and thumb-screw $c$, to the iron frame E, which is slotted or grooved out in the center, so as to permit the plow to be adjusted up or down, and also to permit of different plows being used on the same stock or iron frame E. The slotted frame E is hinged to the rear of the beam A by bolt $d$, upon which fits a nut, $e$.

The plow can be adjusted so as to cut deep or shallow by screwing up or unscrewing nut $f$, which fits on the adjusting-piece F. In using the plow between the rows of young plants there is danger of the earth being thrown upon them, and to prevent which a guard-wheel, G, is hung to an adjusting-frame, H, which is hinged to the frame E by a bolt, $g'$, and connected to the front of the draft-beam A by a screw, $k$, so that the guard-roll G can be set up or down, as fully shown in the drawing. To render the plow more firm, and also to render its use safe on rough land, when it is impracticable to use the guard-wheel G, owing to the liability of the plow to clog up between the guard-wheel G and frame E, a guard knife or blade, I, is hinged to the stock E by a bolt, $g$, upon which fits a nut, $h$, while its other end passes through a staple, $i$, in the side of the beam A. The blade I is also so formed as to fit over the upper end of the plow, whereby the plow is prevented from slipping out of place. Again, the blade I prevents the earth from being thrown upon the young plants when the guard-wheel is removed, as is necessary when working on rough land. The upper end of the blade is formed so as to be capable of sliding up and down in the loop $i$.

The operation of the plow is as follows: The team is hitched to the link-piece J, which is hinged to the beam A by pivot or journal $j$, and the plow drawn along twice or more between the different rows of young plants, the right side of the plow being drawn close up to the plants in each case. In this way the earth is well stirred and the weeds cut close up to the plants, which are protected from injury by the guard-wheel G and guard-blade I.

When it is desired to use the machine as an ordinary cultivator then the guards I and G can be removed entirely.

Having described the plow which I have improved, what I now claim as my invention, and desire to secure by Letters Patent, is—

The combination and arrangement of the guard-blade I with the wheel G, plow D, frame E, and draft-beam A, substantially as set forth.

In witness whereof I have hereunto signed my name.

W. D. IVEY.

In presence of—
JOHN QUINCY ADAMS,
THOS. H. DODGE.